(12) United States Patent
Urabe

(10) Patent No.: US 9,505,160 B2
(45) Date of Patent: Nov. 29, 2016

(54) EXTRUDER

(71) Applicant: The Yokohama Rubber Co., LTD., Minato-ku, Tokyo (JP)

(72) Inventor: Koji Urabe, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/769,789

(22) PCT Filed: Jan. 30, 2014

(86) PCT No.: PCT/JP2014/000481
§ 371 (c)(1),
(2) Date: Aug. 21, 2015

(87) PCT Pub. No.: WO2014/129122
PCT Pub. Date: Aug. 28, 2014

(65) Prior Publication Data
US 2016/0001483 A1    Jan. 7, 2016

(30) Foreign Application Priority Data

Feb. 22, 2013    (JP) ................................ 2013-033402

(51) Int. Cl.
*B29C 47/16*        (2006.01)
*B29C 47/12*        (2006.01)
(Continued)

(52) U.S. Cl.
CPC ........... *B29C 47/16* (2013.01); *B29C 47/0004* (2013.01); *B29C 47/0816* (2013.01); *B29C 47/122* (2013.01); *B29C 47/165* (2013.01);
(Continued)

(58) Field of Classification Search
CPC . B29C 47/0816; B29C 47/122; B29C 47/16; B29C 47/165; B29C 47/30; B29C 47/34
See application file for complete search history.

(56) References Cited

U.S. PATENT DOCUMENTS 3,758,247 A * 9/1973 Deegen ............... B29C 47/0047
264/171.16
4,285,651 A * 8/1981 Fetchu .................... B29C 47/14
156/244.15

FOREIGN PATENT DOCUMENTS

JP         S58-048410       4/1983
JP         S62225319        10/1987
(Continued)

OTHER PUBLICATIONS

International Search Report for International Application No. PCT/JP2014/000481 dated Mar. 4, 2014, 4 pages, Japan.

*Primary Examiner* — Yogendra Gupta
*Assistant Examiner* — Joseph Leyson
(74) *Attorney, Agent, or Firm* — Thorpe North & Western

(57) ABSTRACT

An extruder has a discharge opening formed into a rectangular shape by a pair of end surface forming walls and a pair of side surface forming walls. A die configured to discharge a rubber material pressed out towards the discharge opening as two bands separated from each other at the discharge opening is provided having a height spanning between the pair of end surface forming walls and inserted so as to be movable and adjustable in the axial direction of the discharge opening at the center of the pair of side surface forming walls. The width between the left-right side surface of the die is formed at dimensions that become smaller from the base surface toward the tip surface. A convex curved surface configuring the left-right side surfaces is formed having a radius of curvature that becomes smaller from the base surface toward the tip surface of the die.

4 Claims, 6 Drawing Sheets

(51) Int. Cl.
*B29C 47/08* (2006.01)
*B29C 47/30* (2006.01)
*B29C 47/34* (2006.01)
B29C 47/00 (2006.01)
B29K 21/00 (2006.01)

(52) U.S. Cl.
CPC ............... *B29C 47/30* (2013.01); *B29C 47/34* (2013.01); *B29C 47/0019* (2013.01); *B29C 47/0021* (2013.01); *B29K 2021/00* (2013.01)

(56) References Cited

FOREIGN PATENT DOCUMENTS

| | | |
|---|---|---|
| JP | S62225320 | 10/1987 |
| JP | H10-264228 | 10/1998 |
| JP | 2001-225377 | 8/2001 |
| JP | 2002-355876 | 12/2002 |
| JP | 2005-219254 | 8/2005 |

\* cited by examiner

EXTRUDER

TECHNICAL FIELD

The present technology relates to an extruder configured to discharge rubber pressed out towards a discharge opening as two bands separated from each other at the discharge opening.

BACKGROUND

Conventionally, a technique is known for adjusting the thickness or form of a rubber molded product discharged from a discharge opening to desired dimensions by inserting a die in the discharge opening of the extruder and changing the degree of insertion of the die into the discharge opening.

Meanwhile, for example, in a case of continuously manufacturing a rubber molded product in which two bands made of rubber are attached to both sides of a rubber sheet, it is necessary to continuously manufacture the two bands along with the sheet.

In such a case, when two discharge openings are provided in the extruder, the structure of the discharge openings becomes complicated and the number of the components in the extruder is increased, which is disadvantageous in terms of lowering the cost and achieving compactness of the extruder.

In addition, it is necessary to have a structure which is able to adjust the cross-sectional shape of each of the discharge openings from which rubber is discharged such that the bands have a predetermined shape and thickness. Providing this adjusting structure in each of the discharge openings further increases the number of components in the extruder.

SUMMARY

The present technology provides an extruder which can simultaneously form two bands made of rubber from a single discharge opening, which can adjust the thickness of each band, and which is advantageous in terms of having a lower cost and increased compactness.

The present technology includes an extruder comprising a discharge opening and a die having a height spanning between a pair of end surface forming walls, being inserted between a pair of side surface forming walls in a manner so as to be movable and adjustable in an axial direction of the discharge opening and configured to discharge a rubber material pressed out toward the discharge opening as two bands separated from each other at the discharge opening. The discharge opening is formed into a rectangular shape by a pair of end surface forming walls opposing each other and a pair of side surface forming walls opposing each other. The die has a length in a direction of insertion into the discharge opening and has a tip positioned at a head in the direction of insertion into the discharge opening at one end in the length direction and a base positioned opposite to the tip at another end in the length direction. A width between a pair of side surfaces of the die opposing the pair of side surface forming walls is formed at dimensions that become smaller from the base toward the tip. The pair of side surfaces of the die opposing the pair of side surface forming walls are formed with curved surfaces convex towards the side surface forming walls side. The curved surfaces are formed having a radius of curvature that becomes smaller from the base toward the tip.

According to the present technology, the thickness of the bands is adjusted by moving the die in a pulling back direction back from the discharge opening in a case in which the thickness of the bands discharged from the discharge opening is smaller than the desired dimensions and by moving the die in the direction of insertion into the discharge opening in a case in which the thickness of the bands discharged from the discharge opening is greater than the desired dimensions.

Accordingly, it is possible to simultaneously form two rubber bands from a single discharge opening, and it is possible to adjust the thickness of each of the bands.

In addition, the left and right side surfaces of the die are formed by curved surfaces. Since the curved surfaces are formed with a radius of curvature that becomes smaller along the die from the rubber discharge opening towards the extruder side, there is an advantage in terms of obtaining bands with a rectangular cross-section without swollen sections in the center in the width direction of the side surfaces of the bands, even when the thickness of the bands is changed.

BRIEF DESCRIPTION OF THE DRAWINGS

FIG. 5A is a plan view of the die, FIG. 5B is a front view of the die, FIG. 5C is a side surface view of the die, FIG. 5D is a cross-sectional view along line D-D in FIG. 5A, and FIG. 5E is a cross-sectional view along line E-E in FIG. 5A.

DETAILED DESCRIPTION

Description will be given below of an embodiment of the present technology with reference to the drawings.

Figure 1:
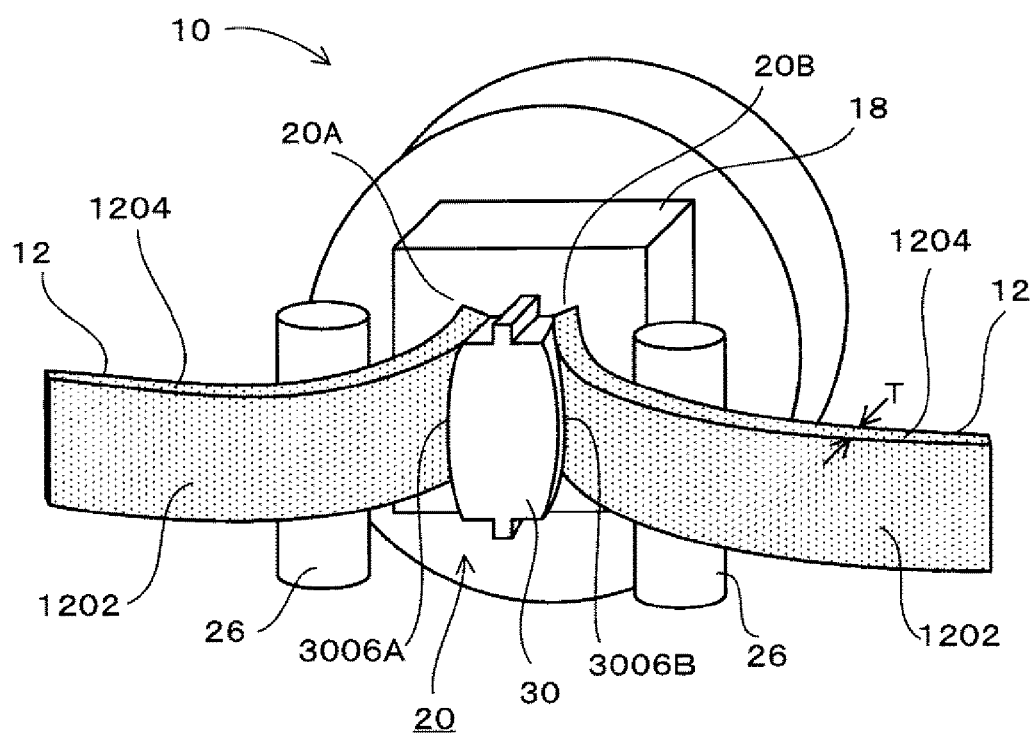
FIG. 1 is a perspective view of a discharge opening portion of an extruder.

As illustrated in FIG. 1, two bands 12 are simultaneously formed by an extruder 10 and each of the bands 12 has a cross-section with a rectangular shape and has a pair of side surfaces 1202 and a pair of end surfaces 1204.

The extruder 10 is provided with a flow path 16 for pressing out a rubber material 14 and is provided with a discharge opening 20, which discharges the rubber material 14 from the flow path 16, in a mouthpiece 18.

The axial direction of the discharge opening 20 extends in the horizontal direction.

Figure 3:
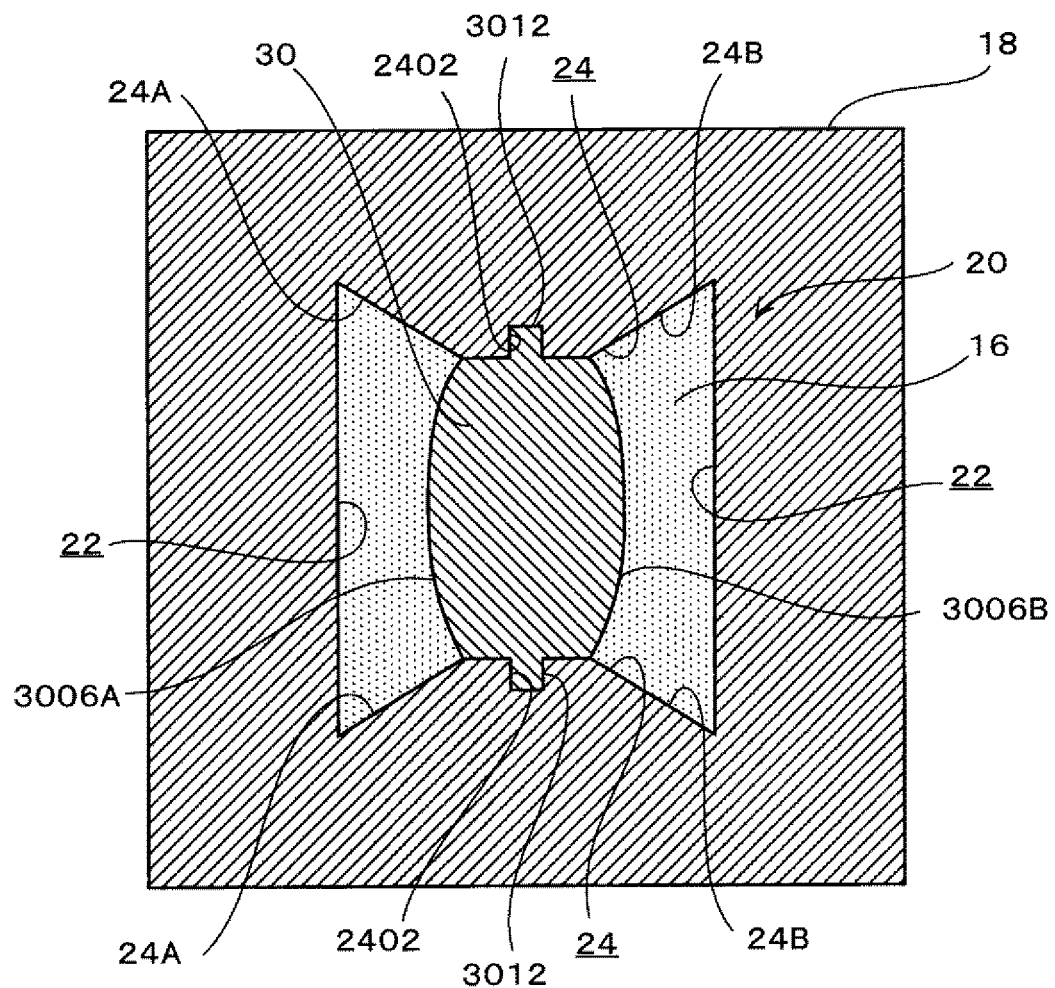
FIG. 3 is a cross-sectional front view of the discharge opening portion of the extruder.
Figure 4:
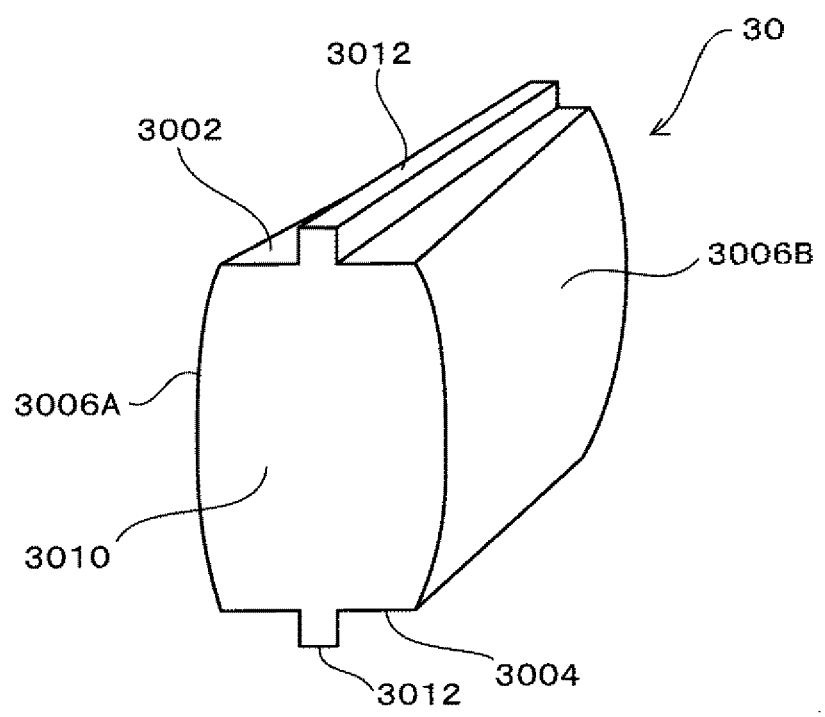
FIG. 4 is a perspective view of a die.

As illustrated in FIG. 3, the discharge opening 20 is provided with side surface forming walls 22 formed of a pair of flat end surfaces opposing and parallel to each other and a pair of end surface forming walls 24 opposing each other.

Figure 2:
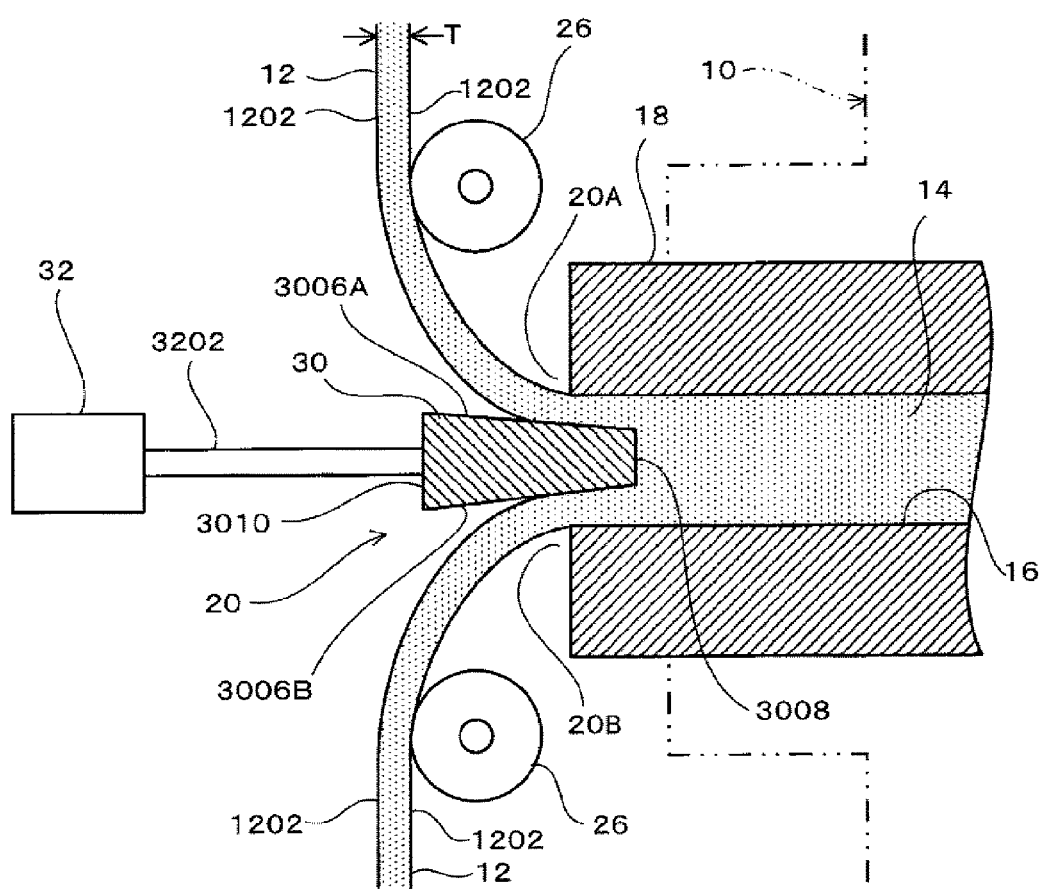
FIG. 2 is a cross-sectional plan view of the discharge opening portion of the extruder.

As illustrated in FIG. 1 and FIG. 2, left and right guide rollers 26 having an axis in the vertical direction are each provided in a manner so as to be rotatable on both the left and right sides to the outside of the discharge opening 20, in more detail, on both sides in the direction intersecting with the discharge direction of the rubber material 14 discharged from the discharge opening 20 and the discharge direction of the rubber material 14 in the horizontal direction. Accordingly, the axes of the left and right guide rollers 26 are parallel to the direction in which the pair of end surface forming walls 24 are joined.

A die 30 is inserted into the discharge opening 20 in a manner so as to be movable and adjustable in the axial direction of the discharge opening 20.

The die 30 has a length in the direction of insertion into the discharge opening 20 and has a height spanning between the pair of end surface forming walls 24. The die 30 is inserted in a manner so as to be movable and adjustable in the axial direction of the discharge opening 20 in the center of the pair of side surface forming walls 22 and is formed such that the rubber material 14 pressed out towards the discharge opening 20 through the flow path 16 is discharged from the discharge opening 20 as the two bands 12 separated from each other.

In more detail, as illustrated in FIGS. 5A to 5E, the die 30 has a flat upper surface 3002 and a flat lower surface 3004 which are able to be slidably brought into contact with each of the pair of end surface forming walls 24, left and right side surfaces 3006A and 3006B connected with both the left and right sides of the upper surface 3002 and both the left and right sides of the lower surface 3004, a tip surface 3008 positioned at the head at one end in the length direction of the die 30 in the direction in which the die 30 is inserted into the discharge opening 20, and a base surface 3010 positioned to be opposite to the tip surface 3008 at the other end in the length direction of the die 30.

Protrusions 3012, which slidably couple with grooves 2402 provided in the pair of end surface forming walls 24 of the discharge opening 20, are provided protruding out from the upper surface 3002 and the lower surface 3004 of the die 30 and the die 30 is guided in a manner so as to be moveable in the axial direction of the discharge opening 20 by the protrusions 3012 coupling with the grooves 2402.

As illustrated in FIG. 2, the die 30 is moved and adjusted in the axial direction of the discharge opening 20 by a driving mechanism 32.

The driving mechanism 32 is, for example, configured by a rod 3202 coupled with the base surface 3010 of the die 30 and a mechanism for moving the rod 3202. It is possible for the mechanism for moving the rod 3202, for example, to employ various conventionally known configurations in which a female screw member is coupled with the base of the rod 3202 in a manner so as to be rotatable and non-movable in the axial direction and the rod 3202 may be moved by rotating a male screw which is screwed into the female screw member, or in which the rod 3202 may be directly moved by an actuator.

By inserting the die 30 into the discharge opening 20, the discharge opening 20 is divided in two, a left discharge opening 20A and a right discharge opening 20B.

In addition, by inserting the die 30 into the discharge opening 20, the pair of end surface forming walls 24 is divided into a pair of left end surface forming walls 24A and a pair of right end surface forming walls 24B.

The pair of left end surface forming walls 24A and the pair of right end surface forming walls 24B are formed with surfaces inclined with the interval between left end surface forming walls 24A and the interval between right end surface forming walls 24B gradually widening as the degree of separation from the die 30 increases.

The left and right side surfaces 3006A and 3006B of the die 30 oppose the side surface forming walls 22 in a state in which the die 30 is inserted into the discharge opening 20, and the left and right side surfaces 3006A and 3006B of the die 30 are formed with curved surfaces convex towards the side surface forming walls 22 side.

The width between the left and right side surfaces 3006A and 3006B of the die 30 is formed with dimensions such that the die 30 becomes smaller from the discharge opening 20 towards the extruder 10 side.

Figure 5:
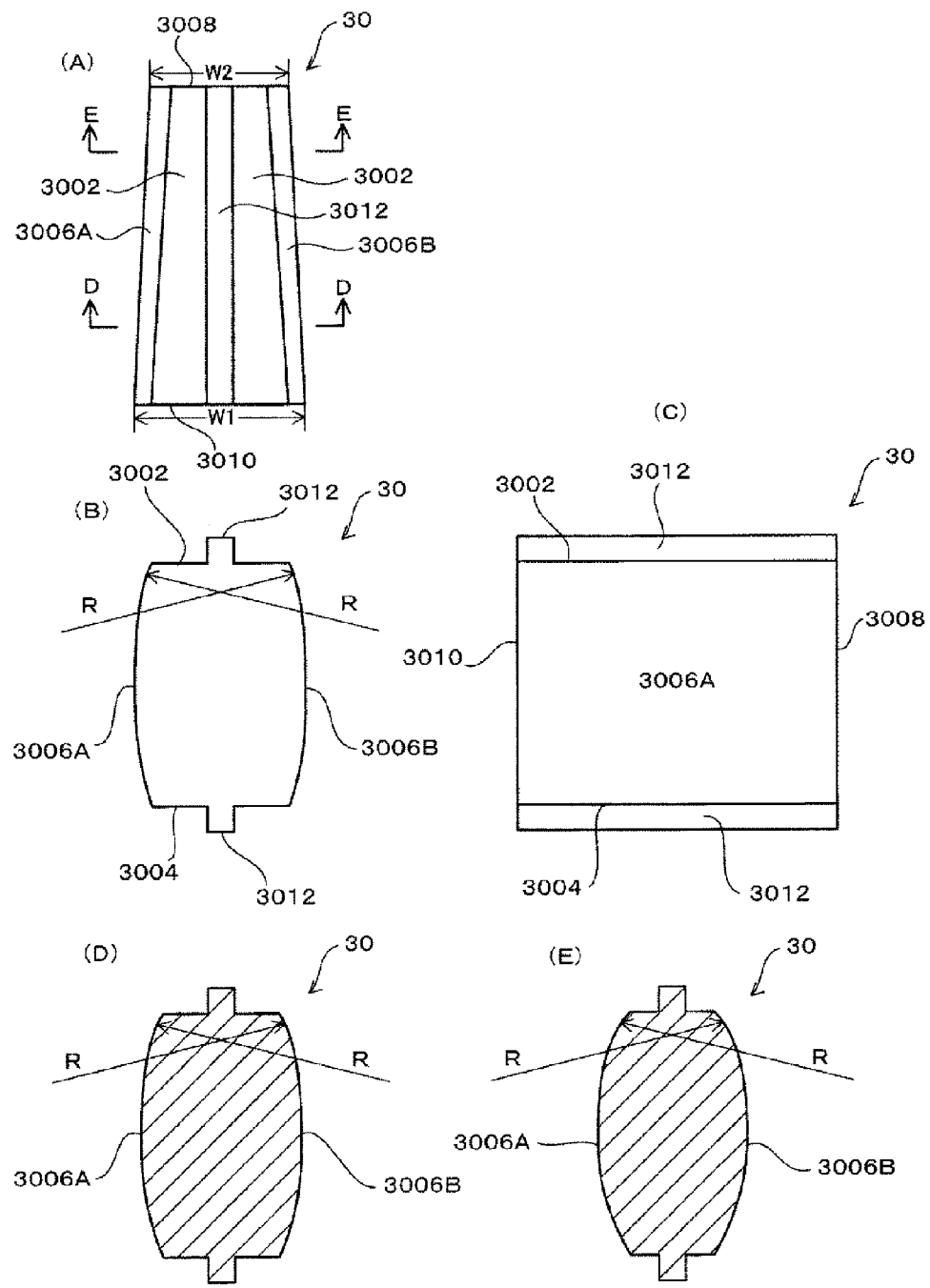
FIGS. 5A to 5E are explanatory diagrams of the die.

In detail, as illustrated in FIG. 5A, the width between the left and right side surfaces 3006A and 3006B of the die 30 is formed with dimensions becoming smaller from the base surface 3010 towards the tip surface 3008. Accordingly, a width W1 at the base surface 3010 is the greatest and a width W2 at the tip surface 3008 is the smallest.

In addition, as illustrated in FIGS. 5D and 5E, the convex curved surfaces are formed with a radius R of curvature that becomes smaller along the die 30 from the discharge opening 20 towards the extruder 10 side, that is, from the base surface 3010 towards the tip surface 3008.

Accordingly, even in a case in which the die 30 is pulled back from the discharge opening 20 side and two bands 12 with thick discharge rubber are formed or a case in which the die 30 is inserted deep into the discharge opening 20 and two bands 12 with thin discharge rubber are formed, it is possible to obtain flat bands 12 in which swelling or depressions do not occur in the center section.

Next, description will be given of the operation and effects of the present embodiment.

The rubber material 14 in the flow path 16 is split into two by the die 30 in the vicinity of the discharge opening 20 and the rubber material 14 is discharged from the left discharge opening 20A as the band 12 with a cross-sectional shape determined by the side surface forming walls 22 of the mouthpiece 18, the pair of the left end surface forming walls 24A, and the left side surface 3006A of the die 30. In addition, the rubber material 14 is discharged from the right discharge opening 20B as the band 12 with a cross-sectional shape determined by the side surface forming walls 22 of the mouthpiece 18, the pair of the right end surface forming walls 24B, and the right side surface 3006B of the die 30.

In the present embodiment, each of the bands 12 discharged from the left and right discharge openings 20A and 20B has the same shape, hangs on the respective guide rollers 26, and is transported in a direction separated from the other by changing the transport direction by 90 degrees.

By changing the transport direction of each of the bands 12 discharged from the left and right discharge openings 20A and 20B by 90 degrees in this manner, there is an advantage in terms of obtaining bands 12 having a flat surface without causing corrugation on the surfaces of each of the bands 12 in comparison with a case of transporting each of the bands 12 discharged from the left and right discharge openings 20A and 20B directly along the discharge directions thereof.

In a case in which a thickness T of the bands 12 discharged from the left discharge opening 20A and the right discharge opening 20B is smaller than the desired dimensions, the die 30 moves in the pulling back direction back from the discharge opening 20, the interval between the side surface forming walls 22 of the mouthpiece 18 and the left side surface 3006A of the die 30 and the interval between the side surface forming walls 22 of the mouthpiece 18 and the right side surface 3006B of the die 30 are widened, and the thickness T of the bands 12 is increased.

In addition, in a case in which the thickness T of the bands 12 discharged from the left discharge opening 20A and the right discharge opening 20B is greater than the desired dimensions, the die 30 moves in the insertion direction into the discharge opening 20, the interval between the side surface forming walls 22 of the mouthpiece 18 and the left side surface 3006A of the die 30 and the interval between the side surface forming walls 22 of the mouthpiece 18 and the right side surface 3006B of the die 30 are narrowed, and the thickness T of the bands 12 is decreased.

Accordingly, by inserting the die 30 into a single discharge opening 20, it is possible to simultaneously form two of the rubber bands 12 from a single discharge opening 20, it is possible to adjust the thickness T of each of the bands 12, and there is an advantage in terms of lowering the costs and increasing the compactness of the extruder 10.

Meanwhile, since the volume of the rubber material 14 expands when discharged from the discharge opening 20, a phenomenon occurs in which the center section in the width direction swells in the side surface 1202 of the band 12. The swelling phenomenon is more remarkable as the thickness of the band 12 increases.

In the present embodiment, since the left and right side surfaces 3006A and 3006B of the die 30 are formed with curved surfaces and the curved surfaces are formed with a radius R of curvature which becomes smaller from the base surface 3010 towards the tip surface 3008, there is an advantage in terms of obtaining the bands 12 with a rectangular cross-section without swollen sections in the center in the width direction of the side surfaces 1202 of the bands, even when the thickness is changed.

In addition, the two bands 12 discharged from the discharge opening 20 are hung on the respective guide rollers 26 and transported.

Figures 6A, 6B:
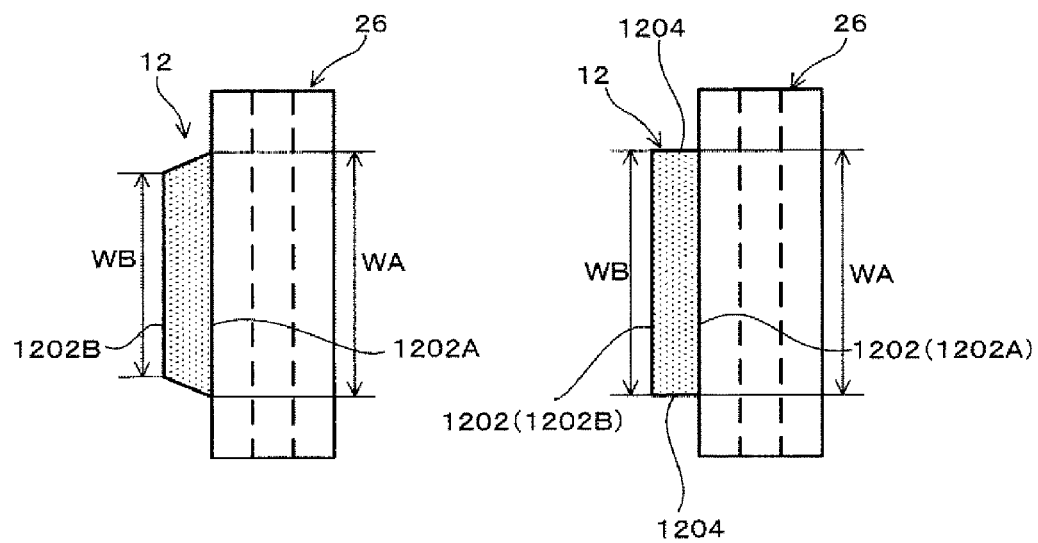
FIGS. 6A and 6B are explanatory diagrams of bands hanging on guide rollers.

Here, as illustrated in FIG. 6A, when the side surfaces 1202 of the bands 12 contacting the guide rollers 26 are inner surfaces 1202A and the surfaces opposite to the inner surfaces 1202A are outer surfaces 1202B, the peripheral velocity of the outer surfaces 1202B are greater than that of the inner surfaces 1202A at the guide rollers 26. Therefore, the bands are stretched by the tensile force acting in the peripheral direction of the guide rollers 26 on the outer surfaces 1202B at the guide rollers 26 and widths WB of the outer surfaces 1202B become smaller than widths WA of the inner surfaces 1202A.

In the present embodiment, the pair of left end surface forming walls 24A and the pair of right end surface forming walls 24B are formed with surfaces inclined at intervals gradually widening as the degree of separation from the die 30 increases.

That is, since the dimensions in the width direction of the side surface 1202 on the stretched side are formed to be large in advance, as illustrated in FIG. 6B, the outer surfaces 1202B are stretched in the peripheral direction of the guide rollers 26 due to the difference in the peripheral velocities at the guide rollers 26, the width WB of the outer surfaces 1202B and the width WA of the inner surfaces 1202A become the same, the pair of end surfaces 1204 are parallel to each other, and there is an advantage in terms of obtaining bands 12 with a rectangular cross-section in which the pair of side surfaces 1202 are parallel to each other.

Accordingly, according to the present embodiment, since it is possible to form two of the rubber bands 12 from a single discharge opening 20 and it is possible to adjust the thickness of each of the bands 12, for example, there is an advantage in terms of lowering the costs and increasing the compactness of the apparatus in the case of continuously manufacturing a rubber molded product in which two bands made of rubber are attached to both sides of a rubber sheet.

Here, in the present embodiment, description was given of a case in which the die 30 is arranged in the center of the pair of side surface forming walls 22 and two of the bands 12 with the same shape are simultaneously formed from the left and right discharge openings 20A and 20B; however, the die 30 may be arranged closer to one out of the pair of side surface forming walls 22 and two of the bands 12 may be simultaneously formed with different thicknesses.

What is claimed is:

1. An extruder comprising:
a discharge opening,
a die having a height spanning between a pair of end surface forming walls, being inserted between a pair of side surface forming walls in a manner so as to be movable and adjustable in an axial direction of the discharge opening, and configured to discharge a rubber material pressed out toward the discharge opening as two bands separated from each other at the discharge opening,
the discharge opening being formed into a rectangular shape by the pair of end surface forming walls opposing each other and the pair of side surface forming walls opposing each other,
the die having a length in a direction of insertion into the discharge opening and having a tip positioned at a head in the direction of insertion into the discharge opening at one end in the length direction and a base positioned opposite to the tip at another end in the length direction,
a width between a pair of side surfaces of the die opposing the pair of side surface forming walls being formed at dimensions that become smaller from the base toward the tip,
the pair of side surfaces of the die opposing the pair of side surface forming walls being formed with curved surfaces convex towards the side surface forming walls side, and
the curved surfaces being formed having a radius of curvature that becomes smaller from the base toward the tip,
wherein:
guide rollers having an axis in a direction parallel to a direction in which the pair of end surface forming walls are joined are provided in a manner so as to be rotatable at both sides outside of the discharge opening,
the bands discharged by being cut into two hang on the respective guide rollers and are transported in directions away from each other,
the pair of end surface forming walls are separated to two sides of the die, which is inserted into the discharge opening, by the die in a direction in which the pair of the side surface forming walls are joined, and
the separated pair of end surface forming walls are formed with surfaces inclined with intervals between the respective sides gradually widening as a degree of separation from the die increases.

2. The extruder according to claim 1, wherein the die is arranged in a center between the pair of side surface forming walls.

3. The extruder according to claim 2, wherein a driving mechanism configured to move and adjust the die in the axial direction of the discharge opening is coupled with the base of the die.

4. The extruder according to claim 1, wherein a driving mechanism configured to move and adjust the die in the axial direction of the discharge opening is coupled with the base of the die.

* * * * *